United States Patent
Kim

(10) Patent No.: US 9,857,473 B2
(45) Date of Patent: Jan. 2, 2018

(54) LIDAR SENSOR SYSTEM

(71) Applicant: Hyundai Mobis Co., Ltd., Seoul (KR)

(72) Inventor: Young Shin Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 605 days.

(21) Appl. No.: 14/445,325

(22) Filed: Jul. 29, 2014

(65) Prior Publication Data

US 2015/0146189 A1 May 28, 2015

(30) Foreign Application Priority Data

Nov. 27, 2013 (KR) .................. 10-2013-0145316

(51) Int. Cl.
| | |
|---|---|
| *G01S 17/93* | (2006.01) |
| *G01S 7/481* | (2006.01) |
| *G01S 17/42* | (2006.01) |
| *G01S 7/48* | (2006.01) |

(52) U.S. Cl.
CPC .......... *G01S 17/936* (2013.01); *G01S 7/4814* (2013.01); *G01S 7/4816* (2013.01); *G01S 7/4802* (2013.01); *G01S 17/42* (2013.01)

(58) Field of Classification Search
CPC ............ G01S 7/486; G01S 17/87; G01C 3/08
See application file for complete search history.

(56) References Cited

U.S. PATENT DOCUMENTS

| | | | | |
|---|---|---|---|---|
| 5,589,930 A | * | 12/1996 | Kurahashi ............. | G01S 17/936 356/4.01 |
| 8,169,596 B2 | * | 5/2012 | Weiss ..................... | G01S 7/4817 356/3.1 |
| 2006/0239558 A1 | * | 10/2006 | Rafii .................. | G06K 9/00201 382/181 |
| 2008/0309917 A1 | * | 12/2008 | Zimmermann ......... | G01S 7/481 356/5.01 |
| 2012/0242972 A1 | * | 9/2012 | Wee ........................ | G01S 7/486 356/4.01 |
| 2015/0131080 A1 | * | 5/2015 | Retterath ................ | G01S 17/10 356/5.01 |

FOREIGN PATENT DOCUMENTS

| | | |
|---|---|---|
| JP | 3038918 B2 | 3/2000 |
| JP | 2012-63230 A | 3/2012 |

OTHER PUBLICATIONS

Korean Office Action dated Feb. 13, 2015, in counterpart Korean Application No. 10-2013-0145316 (5 pages, in Korean).

* cited by examiner

*Primary Examiner* — Luke D Ratcliffe
(74) *Attorney, Agent, or Firm* — NSIP Law

(57) ABSTRACT

Disclosed is a lidar sensor system, including: a transmission unit including one DV lens which emits laser light to a front area of a vehicle, and two SV lenses which emit laser light to left and right side areas of the vehicle; and a reception unit including one DV reception lens which receives light reflected from the front area of the vehicle, and two SV reception lenses which receive light reflected from the left and right side areas of the vehicle.

19 Claims, 3 Drawing Sheets

LIDAR SENSOR SYSTEM

CROSS-REFERENCE TO RELATED APPLICATION

This application claims priority to and the benefit of Korean Patent Application No. 10-2013-0145316 filed in the Korean Intellectual Property Office on Nov. 27, 2013, the entire contents of which are incorporated herein by reference.

TECHNICAL FIELD

The present invention relates to a lidar sensor system, and more particularly, to a lidar sensor system having a wide field of view.

BACKGROUND OF THE INVENTION

Recently, there has been developed a system for recognizing a pedestrian in front of a vehicle, and warning a driver or automatically controlling braking or steering when there is a collision risk to avoid a collision.

The system for recognizing an object in front of a vehicle includes a light detection and ranging (LIDAR) sensor system, which is capable of detecting a distance to a target, a direction, a speed, a temperature, and a material of a target, and the like in order to recognize a target around the vehicle, and the lidar sensor system may emit a laser to a target, and receive information about the target through light reflected from the target.

However, there is a problem in that the lidar sensor used in the related art detects a front obstacle at a relatively long distance and has a narrow field of view, thereby failing to detect a vehicle suddenly entering from a next lane as illustrated in FIG. 4. That is, recently, in order to recognize a vehicle in a situation where the vehicle suddenly cuts in from a next lane in addition to recognize an obstacle in a front area of the vehicle, a demand for a lidar sensor having a wider field of view (FOV) has been increased.

In order to expand the FOV of the lidar sensor, there is a method of increasing sizes of all of lenses and a detector in proportion to the FOV, or expanding only lenses. In the case where all of the lenses and the detector are expanded, there is a problem in that cost of the detector is increased in proportion to the FOV, and in the case where the FOV is increased by expanding only the lenses, resolution and a detection distance are decreased, so that performance deteriorates, that is, a rate of detection of a front obstacle is decreased.

SUMMARY OF THE INVENTION

The present invention has been made in an effort to provide a lidar sensor system which has a wide FOV and is capable of effectively detecting a vehicle even in a cut-in situation.

An exemplary embodiment of the present invention provides a lidar sensor system, including: a transmission unit including a transmission lens which emits laser light to a front area of a vehicle and left and right side areas of the vehicle; and a reception unit including a reception lens which receives light reflected from the front area of the vehicle and the left and right side areas of the vehicle.

The transmission lens may include one dense view (DV) lens unit having a focus so as to densely emit laser light to the front area of the vehicle with a long distance, and sparse view (SV) lens units having a focus so as to emit laser light to the left and right side areas of the vehicle to a short distance.

The SV lens units may be disposed to be bilaterally symmetric based on the DV lens unit, and particularly, the two SV lens units may be symmetrically disposed to each other.

The transmission lens may be formed as a single lens having a focus so as to emit laser light to the front area and the left and right side areas of the vehicle.

The reception lens may include one DV reception lens unit receiving laser light reflected from the front area of the vehicle, and SV reception lens units receiving laser light reflected from the left and right side areas of the vehicle.

The SV reception lens units may be disposed to be bilaterally symmetric based on the DV lens unit, and particularly, the two SV reception lens units may be symmetrically disposed to each other.

Another exemplary embodiment of the present invention provides a lidar sensor system, including: a transmission unit including one DV lens which emits laser light to a front area of a vehicle, and two SV lenses which emit laser light to left and right side areas of the vehicle; and a reception unit including one DV reception lens which receives light reflected from the front area of the vehicle, and two SV reception lenses which receive light reflected from the left and right side areas of the vehicle.

The DV lens may emit laser light so as to detect an obstacle at a long distance in the front area of the vehicle, and the SV lenses may emit laser light so as to detect an obstacle at a short distance in the left and right side areas of the vehicle.

The DV lens and the SV lenses may be integrally formed in a single lens, or the DV lens and the SV lenses may be separately manufactured.

The reception unit may include a detector in which the reflected light received through the DV reception lens and the SV reception lenses is collected, and the detector may be formed of m×n photo diodes.

The detector may include a DV detection unit in which the reflected light of the DV reception lens is collected, and two SV detection units in which the reflected light of the SV reception lenses is collected.

The detector may include the DV detection unit positioned at a center area thereof, and the two SV detection units positioned at both sides of the DV detection unit.

The lidar sensor system may further include a processing unit configured to detect an obstacle from the reflected light received through the reception unit and process the detected obstacle, in which the processing unit may include: an obstacle detection unit configured to calculate information about an obstacle in the front area of the vehicle through the reflected light received through the DV detection unit; an obstacle classification unit configured to classify the type of obstacle in the front area of the vehicle based on the information about the obstacle received from the obstacle detection unit; a cut-in detection unit configured to calculate information about a cutting-in vehicle (obstacle) in the side areas of the vehicle through the reflected light received through the SV detection units; and a controller configured to control the vehicle based on the information about the obstacle received from the cut-in detection unit or the obstacle classification unit.

The obstacle detection unit may transmit detected position and speed information on the obstacle to the obstacle classification unit, and the cut-in detection unit may transmit detected position and speed information on the obstacle to the controller.

The obstacle classification unit may classify the obstacle into a vehicle and a pedestrian based on the detected position and speed information on the obstacle, and transmit information on the type, the position, and the speed of the obstacle to the controller.

The controller may generate a warning signal for a driver or automatically control steering or braking of the vehicle when the obstacle is detected.

According to the exemplary embodiments of the present invention, it is possible to expand a FOV by using one DV lens for a front area and two SV lenses for side areas, and achieve a wide FOV by using the separated detector without additional increase of cost.

DETAILED DESCRIPTION OF THE EMBODIMENTS

Figure 1:
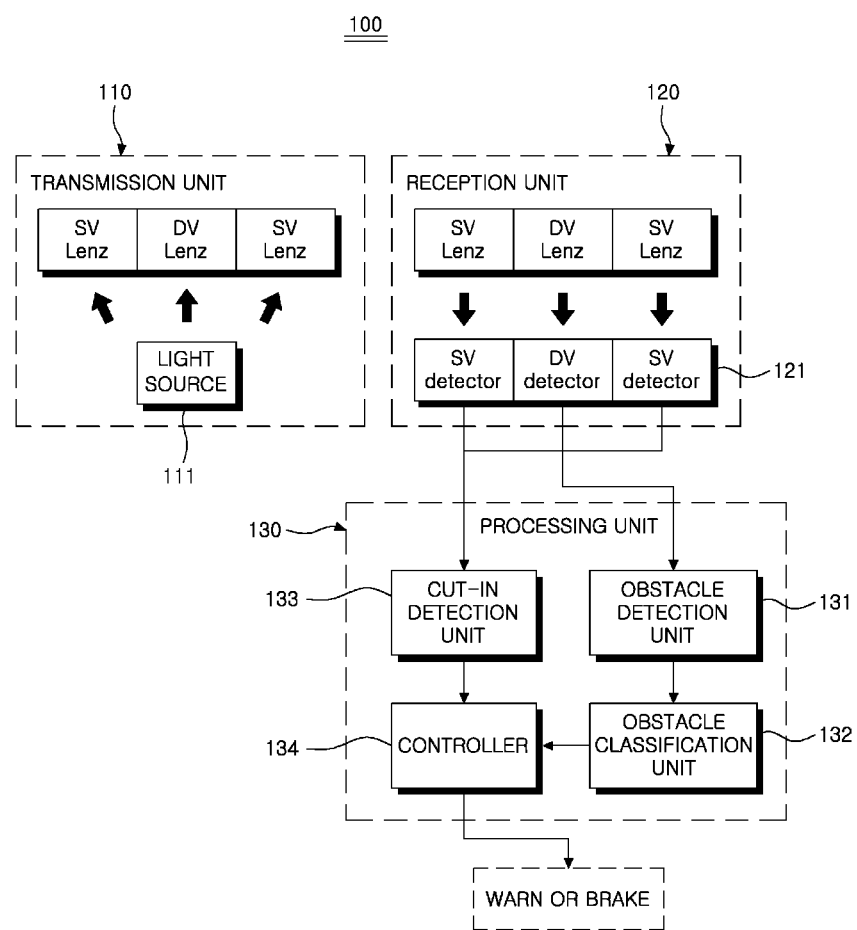
FIG. 1 is a schematic diagram illustrating a lidar sensor system of the present invention.

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The present exemplary embodiments are provided for render the disclosed contents of the present invention complete and provide a complete understanding of and sufficiently transfer the scope of the invention to a person with ordinary skill in the technical field to which the present invention pertains, and the present invention will only be defined by the scope of the claims. Like reference numerals indicate like elements throughout the specification.

Accordingly, in some exemplary embodiments, well-known process steps, publicly known structures, and publicly known technologies are not described in detail in order to avoid obscure interpretation of the present invention.

The terms used in the present specification are for explaining the embodiments rather than limiting the present invention. Unless particularly stated otherwise in the present specification, a singular form also includes a plural form. The word "comprises" and/or "comprising" used in the present specification will be understood to imply the inclusion of stated constituents, steps, and/or operations but not the exclusion of any other constituents, steps, and/or operations. The term "and/or" includes each of the mentioned items or all of the combinations including one or more items.

Exemplary embodiments described in the present specification will be described with reference to a perspective view, a cross-sectional view, a side view, and/or a schematic view, which are ideal example diagrams of the present invention. Accordingly, a form of the example diagram may be modified by a manufacturing technology and/or an allowable error. Accordingly, the exemplary embodiments of the present invention are not limited to the illustrated specific form, but include a change in a form generated according to a manufacturing process. Further, in each diagram illustrated in the present invention, each constituent element is illustrated to be slightly expanded or reduced considering convenience of a description.

Hereinafter, a lidar sensor system according to an exemplary embodiment of the present invention will be described in detail with reference to the accompanying drawings.

Figure 2:
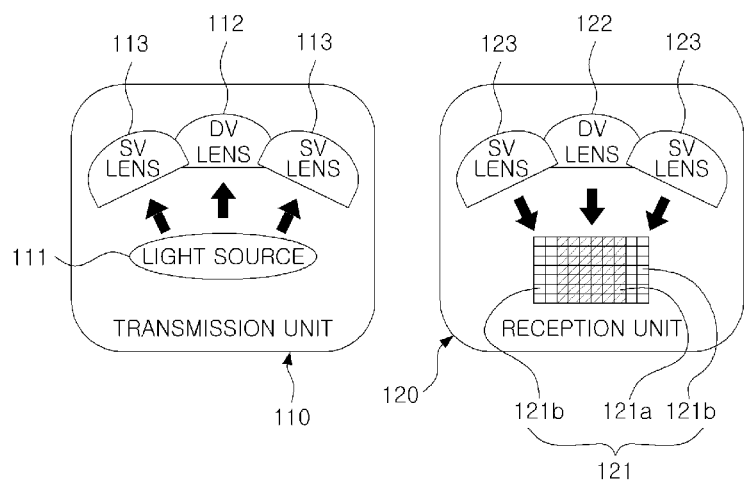
FIG. 2 is a schematic diagram illustrating a transmission unit and a reception unit of the lidar sensor system of the present invention.
Figure 3:
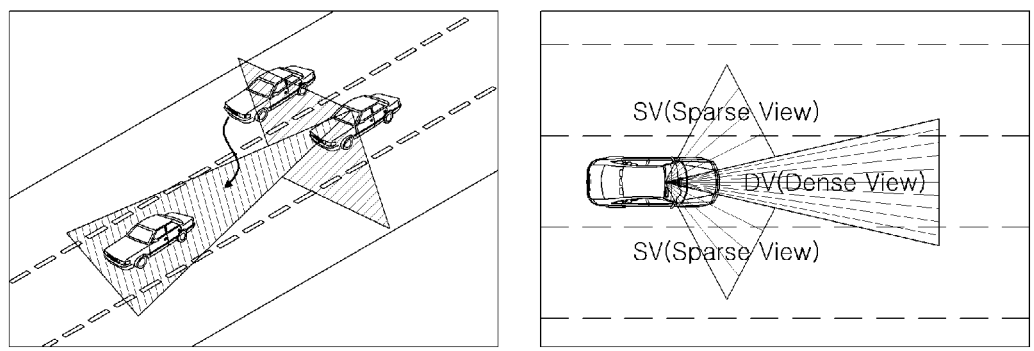
FIG. 3 is a schematic diagram illustrating a vehicle mounted with the lidar sensor system of the present invention.
Figure 4:
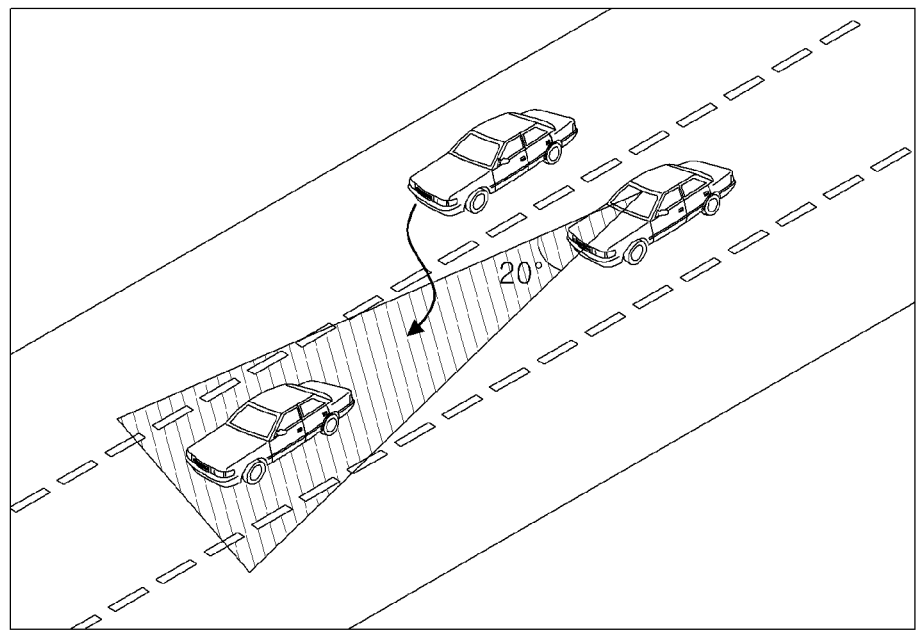
FIG. 4 is a schematic diagram illustrating a vehicle mounted with a lidar sensor system in the related art.

As illustrated in FIGS. 1 to 3, a lidar sensor system 100 of the present invention may include a transmission unit 110 transmitting laser light in a front area of a vehicle, a reception unit 120 receiving light reflected from an obstacle, and a processing unit 130 detecting an obstacle from the received reflected light and processing the detected obstacle.

The transmission unit 110 may include a transmission lens including a dense view (DV) lens unit having a focus so as to emit laser light to a long distance in a front direction of the vehicle and sparse view (SV) lens units having focuses so as to emit laser light to a short distance in side directions of the vehicle, in order to detect obstacles in the front area and the side areas of the vehicle by using a single laser light source 111.

In the present exemplary embodiment, the transmission lens may include one DV lens 112 emitting laser light to a long distance in the front direction of the vehicle, and two SV lenses 113 emitting laser light to a short distance in the side directions of the vehicle.

Unlike this, the transmission lens may be manufactured by forming a plurality of lens units having different focuses in a single lens. For example, a DV lens unit emitting laser light to a long distance in the front direction of the vehicle, and two SV lens units emitting laser light to a short distance in the side directions of the vehicle may be integrally formed in a single lens.

Unlike this, one DV lens unit emitting laser light to a long distance in the front direction of the vehicle and a plurality of SV lens units having a plurality of focuses emitting laser light to a short distance in the side directions of the vehicle may be integrally formed in a single lens so as to be symmetric based on the DV lens unit.

Unlike this, the transmission lens may be configured as a single lens having a single focus so as to emit laser light within a wide range in the front direction and the side directions of the vehicle.

That is, the transmission lens included in the transmission unit 110 may be variously modified and implemented without being limited by a configuration and a shape thereof if the transmission lens may emit laser light in the front direction and the both side directions of the vehicle.

As illustrated in FIG. 3, the DV lens 112 emits laser light within a relatively narrow and dense DV region so as to detect an obstacle at a long distance in the front area of the vehicle, and the reception unit 120 may receive the light reflected from the obstacle in the DV region through a DV reception lens 122 of the reception unit 120.

The SV lens 113 emits laser light within a relatively wide SV region so as to detect an obstacle at a short distance in the both lateral directions of the vehicle, and the reception unit 120 may receive the light reflected from the obstacle in the SV region through a SV reception lens 123 of the reception unit 120.

The reception unit 120 receives the light reflected from the obstacle in the front area or the side areas of the vehicle, and may include a reception lens including a DV reception lens unit receiving the light reflected from the DV region and an SV reception lens unit receiving the light reflected from the SV region, and a detector 121 receiving the reflected light.

In the present exemplary embodiment, the reception lens may include one DV reception lens 122 receiving the light reflected from the DV region through the DV lens 112 of the transmission unit 110, and two SV reception lenses 123 receiving the light reflected from the SV region through the SV lens 113 of the transmission unit 110.

Unlike this, the reception lens may be manufactured by forming a plurality of lens units having different focuses in a single lens. For example, the DV reception lens unit receiving the reflected light of the DV region and two SV reception lens units receiving the reflected light of the SV region may be integrally formed in the single lens.

Unlike this, one DV reception lens unit and a plurality of SV reception lens units may be integrally formed in the single lens so as to be symmetric based on the DV lens unit.

That is, the reception lens included in the reception unit 120 may be variously modified and implemented without being limited by a configuration and a shape thereof if the reception lens may receive the light reflected from the front direction and the both side directions of the vehicle.

The DV reception lens 122 and the SV reception lens 123 used in the reception unit 120 simply have different names, but may substantially be manufactured so as to have the same dimension as that of the DV lens 112 and the SV lens 13 of the transmission unit 110.

The detector 121 may be formed of photo diodes in an m×n matrix as illustrated in FIG. 2, and the detector 121 may include a DV detection unit 121a receiving the reflected light received from the DV reception lens 122 at a center area thereof, and SV detection units 121b receiving the reflected light received from the SV reception lens 123 at both sides of the detector.

That is, in the detector 121 of the present exemplary embodiment, the DV detection unit 121a may detect high resolution information of the DV region and measure a long distance by receiving intensive light, and the SV detection unit 121b has low resolution and has a short detection distance, but may detect the wide SV region, thereby detecting a cutting-in vehicle.

That is, in the present invention, one detector 121 is divided into one DV detection unit 121a and the two SV detection units 121b for use, so that there is an effect in effectively using one detector 121 without additional cost.

The processing unit 130 detects an obstacle in the front area and the side areas of the vehicle based on the information about the reflected light received through the reception unit 120, and may perform warning or braking control by discriminating a case into a case where a front vehicle is detected and a case where a vehicle cutting-in from the lateral direction is detected.

As illustrated in FIG. 1, the processing unit 130 of the present exemplary embodiment may include an obstacle detection unit 131, an obstacle classification unit 132, a cut-in detection unit 133, and a controller 134.

The obstacle detection unit 131 may receive information about the reflected light of the DV region received through the DV detection unit 121a of the detector 121 and calculate information about an obstacle when the obstacle exists. The obstacle detection unit 131 of the present exemplary embodiment may detect the front obstacle based on a coordinate value, a distance value, and a reflection value of the obstacle detected by the DV detection unit 121a, and transmit a region of interest (ROI) and speed information about the obstacle to the obstacle classification unit 132.

The obstacle classification unit 132 may classify the type of obstacles positioned in the front area of the vehicle into a vehicle, a pedestrian, and the like based on the ROI and the speed information about the obstacle received from the obstacle detection unit 131. Then, the obstacle classification unit 132 may transmit the type, the ROI, and the speed information about the selected obstacle to the controller 134.

The cut-in detection unit 133 may receive information about the reflected light of the SV region received through the SV detection units 121b of the detector 121 and calculate information about an obstacle when the obstacle (cutting-in vehicle) exists. The cut-in detection unit 133 of the present exemplary embodiment may determine a cut-in situation (whether a cutting-in vehicle exists) based on a coordinate value, a distance value, and a reflection value of the obstacle detected by the SV detection units 121b, and transmit an ROI and speed information about the cutting-in vehicle to the controller 134.

The controller 134 controls the vehicle based on the information about the obstacle received from the cut-in detection unit 133 or the obstacle detection unit 131, and when the obstacle detection unit 131 determines that an obstacle exists in the front area of the vehicle (DV region), the controller 134 may generate a warning signal, such as a warning sound, for a driver, or automatically control steering or braking in the case where an emergency situation occurs. In the meantime, when the cut-in detection unit 133 determines that the cutting-in vehicle from the left side or the right side (SV region) of the vehicle exists, the controller 134 may generate a warning signal or brake the vehicle.

As described above, the lidar sensor system of the present invention may detect an obstacle in the front area of the vehicle, and whether a cutting-in vehicle from the lateral side of the vehicle exists, and achieve a wide FOV without using a high-cost detector.

The lidar sensor system of the present invention has been described with reference to the exemplary embodiments of the present invention, but those skilled in the art will understand that the present invention may be implemented in other specific forms without changing the technical spirit or an essential feature thereof. Thus, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A lidar sensor system, comprising:
    a transmission unit comprising a transmission lens configured to emit laser light to a front area of a vehicle, a left side area of the vehicle, and a right side area of the vehicle; and
    a reception unit comprising:
        a dense view (DV) reception lens configured to receive light reflected from the front area of the vehicle,
        a first sparse view (SV) reception lens configured to receive light reflected from the left side area of the vehicle, and
        a second SV reception lens configured to receive light reflected from the right side area of the vehicle, and
        a detector comprising a photodiode array and configured to collect the light received by the DV reception lens at a center area of the array, to collect the light received by the first SV reception lens at a left side area of the array, and to collect the light received by the second SV reception lens at a right side area of the array.

2. The lidar sensor system of claim 1, wherein the transmission lens comprises:
   a DV transmission lens unit having a focus so as to densely emit laser light to the front area of the vehicle with a long distance; and
   SV transmission lens units having a focus so as to emit laser light to the left and right side areas of the vehicle to a short distance.

3. The lidar sensor system of claim 2, wherein the SV transmission lens units are disposed to be bilaterally symmetric based on the DV transmission lens unit.

4. The lidar sensor system of claim 3, wherein two SV transmission lens units are among the SV lens unit are symmetrically disposed to each other.

5. The lidar sensor system of claim 1, wherein the transmission lens is formed as a single lens having a focus so as to emit laser light to the front area of the vehicle, the left side area of the vehicle, and right side areas of the vehicle.

6. The lidar sensor system of claim 1, wherein the reception lens comprises:
   a dense view (DV) reception lens unit configured to receive laser light reflected from the front area of the vehicle; and
   sparse view (SV) reception lens units configured to receive laser light reflected from the left side area of the vehicle and right side areas of the vehicle.

7. The lidar sensor system of claim 6, wherein the SV reception lens units are disposed to be bilaterally symmetric based on the DV reception lens.

8. The lidar sensor system of claim 7, wherein two SV reception lens units from among the SV reception units are symmetrically disposed to each other.

9. A lidar sensor system, comprising:
   a transmission unit comprising:
      a dense view (DV) transmission lens configured to emit laser light to a front area of a vehicle, and
      a sparse view (SV) transmission lenses configured to emit laser light to a left side area of the vehicle and a right side areas of the vehicle; and
   a reception unit comprising:
      a DV reception lens configured to receive light reflected from the front area of the vehicle,
      a first SV reception lens configured to receive light reflected from the left side area of the vehicle, and
      a second SV reception lens configured to receive light reflected from the right side area of the vehicle, and
      a detector comprising a photodiode array and configure to collect the light received by the DV reception lens at a center area of the array, to collect the light received by the first SV reception lens at a left side area of the array, and to collect the light received by the second SV reception lens at a right side area of the array.

10. The lidar sensor system of claim 9, wherein:
    the DV transmission lens is configured to emit laser light so as to detect an obstacle at a long distance in the front area of the vehicle; and
    the SV transmission lenses are configured to emit laser light so as to detect an obstacle at a short distance in the left side area of the vehicle and right side area of the vehicle.

11. The lidar sensor system of claim 10, wherein the DV transmission lens and the SV transmission lenses are integrally formed in a single lens.

12. The lidar sensor system of claim 10, wherein the DV transmission lens and the SV transmission lenses are separately manufactured.

13. The lidar sensor system of claim 9, wherein the detector is configured to collect the light received by the DV reception lens and the light received by the SV reception lenses.

14. The lidar sensor system of claim 13, wherein the detector comprises:
    a DV detection unit in which the reflected light of the DV reception lens is collected; and
    SV detection units in which the reflected light of the SV reception lenses is collected.

15. The lidar sensor system of claim 14, wherein:
    the DV detection unit positioned at a center area of the detector; and
    the SV detection units positioned at both sides of the DV detection unit.

16. The lidar sensor system of claim 15, further comprising:
    a processing unit configured to detect an obstacle from the reflected light received through the reception unit and process the detected obstacle,
    wherein the processing unit comprises:
       an obstacle detection unit configured to calculate information about an obstacle in the front area of the vehicle based on the reflected light received by the DV detection unit,
       an obstacle classification unit configured to classify the type of obstacle in the front area of the vehicle based on the information about the obstacle received from the obstacle detection unit,
       a cut-in detection unit configured to calculate information about a cutting-in vehicle (obstacle) in the side areas of the vehicle based on the reflected light received by the SV detection units, and
       a controller configured to control the vehicle based on the information about the obstacle received from either one or both of the cut-in detection unit or the obstacle classification unit.

17. The lidar sensor system of claim 16, wherein:
    the obstacle detection unit is configured to transmit detected position and speed information on the obstacle to the obstacle classification unit; and
    the cut-in detection unit is configured to transmit detected position and speed information on the obstacle to the controller.

18. The lidar sensor system of claim 17, wherein the obstacle classification unit is configured to:
    classify the obstacle as a vehicle or a pedestrian based on the detected position and speed information on the obstacle; and
    transmits information on the type, the position, and the speed of the obstacle to the controller.

19. The lidar sensor system of claim 18, wherein the controller is configured to:
    generates a warning signal for a driver in response to the object being detected; or
    automatically control steering or braking of the vehicle in response to the object being detected.

* * * * *